United States Patent [19]

Riddel

[11] 4,220,218

[45] Sep. 2, 1980

[54] VEHICLE ROAD SPEED CONTROL SYSTEM WITH FLOW AMPLIFIER

[75] Inventor: John W. Riddel, Fenton, Mich.

[73] Assignee: General Motors Corporation, Detroit, Mich.

[21] Appl. No.: 10,610

[22] Filed: Feb. 9, 1979

[51] Int. Cl.³ .............................................. B60K 31/00
[52] U.S. Cl. ..................................... 180/176; 123/401
[58] Field of Search ......................... 180/171, 175–177; 123/103 R, 103 A, 103 C

[56] References Cited

U.S. PATENT DOCUMENTS

| 3,211,251 | 10/1965 | Parker | 180/175 |
| 3,999,622 | 12/1976 | Reed | 180/108 |
| 4,082,158 | 4/1978 | Carol, Jr. et al. | 180/108 |
| 4,133,408 | 1/1979 | Riddel | 180/108 |

Primary Examiner—John J. Love
Attorney, Agent, or Firm—D. D. McGraw

[57] ABSTRACT

A vehicle road speed control system for a transducer generating a vacuum control signal which is delivered to a flow amplifier. The flow amplifier generates a positive pressure control signal in accordance with the vacuum control signal. The positive pressure control signal powers a servomotor to control the vehicle engine throttle and maintain vehicle road speed at a desired value.

2 Claims, 1 Drawing Figure

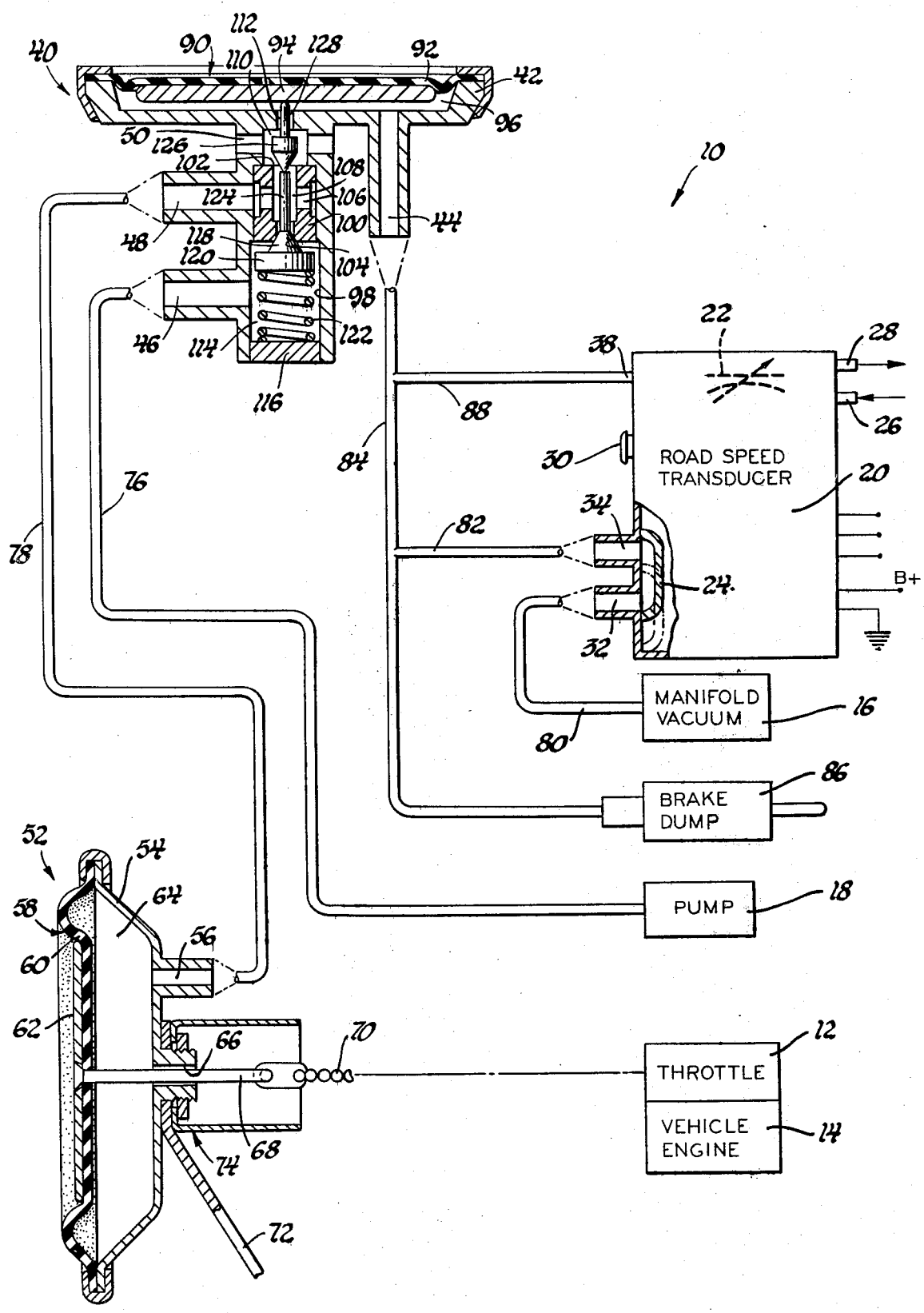

VEHICLE ROAD SPEED CONTROL SYSTEM WITH FLOW AMPLIFIER

The invention relates to a vehicle road speed control system which uses engine intake manifold vacuum to control a flow amplifier. The flow amplifier proportions a positive pressure to a positive pressure operated cruise control power unit or servomotor. The positive pressure may be engine exhaust pressure or a superatmospheric pressure received from an air pump. The flow amplifier receives atmospheric air pressure, superatmospheric pressure from a suitable source, and subatmospheric control pressure generated in a vehicle road speed transducer. The flow amplifier generates a superatmospheric control pressure from the atmospheric pressure and the superatmospheric pressure received by it, the superatmospheric control pressure being generated in accordance with the subatmospheric control pressure received from the transducer. The superatmospheric control pressure is delivered to a servomotor arranged to receive that control pressure on one side of a power wall having atmospheric air pressure on the other side. Therefore the power wall moves and responds to changes in the superatmospheric control pressure. The servomotor power wall is connected to the vehicle engine throttle so that movement of the power wall will control actual vehicle speed and that speed will be maintained substantially at the desired vehicle speed so long as the road speed control transducer is activated.

The single FIGURE in the drawing is a schematic representation of a vehicle road speed control system embodying the invention, with parts broken away and in section.

The vehicle road speed control system 10 is illustrated as controlling the throttle 12 of a vehicle engine 14. The vehicle engine provides a source 16 of engine intake manifold vacuum. A source of super-atmospheric pressure is schematically illustrated as pump 18. Exhaust pressure from engine 14 may also be used for this purpose. The vehicle road speed transducer 20 of the system is schematically illustrated as having a control valve 22, a switch valve 24, a speedometer cable drive inlet 26 and outlet 28, and suitable electrical connections. The transducer may be of the general type disclosed in U.S. Pat. No. 3,419,105, entitled "Vehicle Road Speed Control System" and issued Dec. 31, 1968. The control valve 22 may be a duty cycle valve such as that disclosed in U.S. Pat. No. 3,088,538, entitled "Vehicle Warning and Cruise Control System" and issued May 7, 1963. The transducer 20 has an atmospheric air inlet 30, a pair of ports 32 and 34 for controlling the supply of vacuum from vacuum source 16 by means of proper positioning of the vacuum switch valve 24, a vacuum control pressure port 38, and suitable electrical connections for operation of the transducer. The flow amplifier 40 has a housing 42 provided with a control vacuum port 44, a pressure port 46, a control pressure port 48, and atmospheric air inlets 50. The servomotor 52 has a housing 54 provided with a control pressure inlet port 56. Housing 54 cooperates with a power wall 58, formed of a diaphragm 60 and a pressure plate 62, to define a power chamber 64 into which port 56 opens. Housing 54 has an axially located passage 66 through which the servometer output rod 68, mounted on the power wall 58, extends outwardly of the housing. The outer end of output rod 68 is suitably connected to a chain link 70 which is in turn operatively connected to the engine throttle 12 so that movement of the power wall to tension the chain link will exert a force on the throttle tending to open the throttle. The servomotor 52 is suitably mounted in the vehicle engine compartment by a mounting bracket 72, and is secured in place on the bracket by the nut and shield 74. A conduit 76 is connected with the pump 18 and the pressure port 46 of the flow amplifier 40 so as to conduct superatmospheric pressure to the interior of the flow amplifier. Conduit 78 connects the control pressure port 48 of the flow amplifier with the control pressure inlet port 56 of servomotor 52 and conducts superatmospheric control pressure from the flow amplifier 42 of the servomotor. Conduit 80 connects the intake manifold 16 with port 32 of transducer 20 and conduit 82 is connected with port 34 of the transducer. Conduit 82 leads to conduit 84, which is connected with the control vacuum port 44 of flow amplifier 40 and also with a brake dump valve 86. Another conduit 88 is connected with port 38 of transducer 20 and with conduit 84. It can be seen that when switch valve 24 is in the position illustrated in solid lines, port 32 is connected to port 34 so that vacuum from manifold 16 is imposed in conduits 82, 84 and 88 as well as in control vacuum port 44 of the flow amplifier 40. Likewise, when switch valve 24 is in the position illustrated in dotted lines, port 32 is disconnected from port 34, port 34 being at atmospheric pressure by means of atmospheric air entering transducer 20 at inlet 30. Therefore the conduits 82, 84 and 88 and control vacuum port 44 are at atmospheric pressure.

Housing 42 of flow amplifier 40 cooperates with a power wall 90, formed by diaphragm 92 and pressure plate 94, to define the amplifier power chamber 96. Control vacuum port 44 opens into chamber 96. Another portion of housing 42 extending generally perpendicularly to power wall 90 has a bore 98 formed therethrough. A valve sleeve 100 is secured in an intermediate portion of bore 98. Sleeve 100 is formed at its upper end to provide a valve seat 102 and at its lower end to provide a valve seat 104. Between the two valve seats is a cross passage 106 intersecting the chamber 108 defined by the interior of sleeve 100. Cross passage 106 is in continuous communication with the control pressure port 48. The portion of bore 98 intermediate sleeve 100 and chamber 96 defines a valve chamber 110 to which atmospheric air inlets 50 are connected. The end of the bore 98 between chamber 110 and chamber 96 is formed as a small passage 112 which provides communication between chambers 96 and 110. The portion 114 of bore 98 adjacent valve seat 104 is in continuous communication with pressure port 46, with the end of the bore being sealed by a plug 116. A valve 118 is positioned in bore portion 114 so as to cooperate with valve seat 104 in opening and closing fluid communication between bore portion 114 and chamber 108. Valve 118 has an enlarged valve end 120 positioned in bore portion 114. A valve spring 122 is located in bore portion 114 and acts against plug 116 and valve end 120 to continually urge valve 118 toward engagement with its valve seat 104. Valve 118 has a stem 124 extending into chamber 108 to a point generally adjacent the valve seat 102. Another valve 126 is located in valve chamber 110 and cooperates with seat 102 to open and close the fluid communication between chambers 108 and 110, valve 126 is in engagement with valve stem 124. Valve 126 has a valve stem 128 extending through passage 112 and in engagement with the side of pressure plate 94 forming a part of chamber 96. The outer surface of the power wall 90 is exposed to atmospheric pressure at all times.

When the vehicle road speed control system is actuated, transducer 20 is energized so as to establish a desired vehicle speed. Switch valve 36 is moved to connect ports 32 and 34 so that manifoled vacuum is imposed in chamber 96 as modified by control valve 22. Therefore the pressure in chamber 96 indicates the desired vehicle speed. This pressure acts on power wall 90 to move the power wall against stem 128 of valve 126, tending to move valve 126 towards engagement with its seat 102 and at the same time tending to move valve 118 away from its valve seat 104, acting against the force of spring 122. The superatmospheric pressure from pump 18 enters port 46 and is contained in chamber 114. As valve 118 moves in an opening direction this pressure is controllably admitted to chamber 108 and pressure port 48. The tendency of this pressure to bleed to atmospheric air inlets 50 through chamber 110 past valve seat 102 and valve 126 is modified by the positioning of valve 126 under the control of power wall 90. Therefore, the flow amplifier 40 generates a superatmospheric control pressure at control pressure port 48 from atmospheric pressure and the superatmospheric pressure received by it in accordance with the subatmospheric control pressure provided in chamber 96. The superatmospheric control pressure is conducted by conduit 78 to inlet port 56 of servomotor 52 and introduced into the power chamber 64 so that it acts on one side of power wall 58. The other side of power wall 58 is continually exposed to atmospheric pressure. The positive pressure in chamber 64 causes the power wall 58 to move, tensioning chain link 70 in a desired amount and to a desired position to control the throttle valve 12 and therefore the vehicle engine 14 so that the vehicle actual speed is maintained substantially at the desired vehicle speed.

One of the major advantages of structure embodying the invention is that the air flow into the vehicle engine intake manifold is insignificant even with a vehicle having a closed loop air/fuel control, while still retaining the desirable negative feedback characteristic of intake manifold vacuum. Also the use of positive pressure for generating a control pressure will partially offset vacuum feedback, thus giving a more accurate control for a low vacuum engine. A further advantage is that sufficient force is available to obtain a downshift if that seems advisable. The flow amplifier has a fail safe construction in that pressure acts to close it off. Thus a definite application of vacuum is required to obtain an output control pressure.

The embodiments of the invention in which an exclusive property or privilege is claimed are defined as follows:

1. A vehicle road speed control system for a vehicle having an engine provided with an intake manifold acting as a source of subatmospheric pressure, and a source of superatmospheric pressure, said system comprising:

a selectively activated vehicle road speed transducer arranged to receive an actual vehicle road speed signal, a desired vehicle road speed signal, subatmospheric pressure from said manifold and atmospheric air pressure, said transducer when activated generating a subatmospheric control pressure from said received pressures and signals;

a flow amplifier arranged to receive atmospheric air pressure, superatmospheric pressure from said source and said subatmospheric control pressure from said transducer, said flow amplifier generating a superatmospheric control pressure from the atmospheric pressure and superatmospheric pressure received by it in accordance with said subatmospheric control pressure;

a servomotor having a power wall arranged to receive atmospheric air pressure and said superatmospheric control pressure on opposite power wall sides to move and position said power wall in respone to changes in said superatmospheric control pressure;

and vehicle engine control means arranged to be controlled by movement of said power wall so that the actual vehicle speed is maintained substantially at the desired vehicle speed while said transducer is activated.

2. a vehicle road speed control system for a vehicle having an engine provided with an intake manifold acting as a source of subatmospheric pressure, and a source of superatmospheric pressure, said system comprising:

a selectively activated vehicle road speed transducer arranged to receive an actual vehicle road speed signal, a desired vehicle road speed signal, subatmospheric pressure from said manifold and atmospheric air pressure, said transducer when activated generating a subatmospheric control pressure from said received pressures and signals;

a flow amplifier having a movable power wall responsive to said subatmospheric control pressure, and valve means responsive to movements of said movable power wall and receiving superatmospheric pressure from said source and atmospheric pressure, said valve means generating a superatmospheric control pressure from the atmospheric pressure and superatmospheric pressure received by it in accordance with said subatmospheric control pressure, said valve means being open only to atmospheric air pressure when there is no subatmospheric control pressure acting on said movable power wall;

a servomotor having a power wall arranged to receive atmospheric air pressure and said superatmospheric control pressure on opposite power wall sides to move and position said power wall in response to changes in said superatmospheric control pressure;

and vehicle engine control means arranged to be controlled by movement of said power wall so that the actual vehicle speed is maintained substantially at the desired vehicle speed while said transducer is activated.

\* \* \* \* \*